(12) United States Patent
Thaxton

(10) Patent No.: US 6,286,797 B1
(45) Date of Patent: Sep. 11, 2001

(54) ILLUMINATION ASSEMBLY

(76) Inventor: Rocky A. Thaxton, 11431 N. P. St., La Porte, TX (US) 77571

( * ) Notice: Subject to any disclaimer, the term of this patent is extended or adjusted under 35 U.S.C. 154(b) by 0 days.

(21) Appl. No.: 09/399,670

(22) Filed: Sep. 21, 1999

(51) Int. Cl.[7] .................................................. A47G 1/00
(52) U.S. Cl. ................................. 248/229.14; 248/316.4
(58) Field of Search ....................... 248/229.1, 229.14, 248/229.12, 231.41, 229.5, 540, 541, 316.4, 316.6

(56) References Cited

U.S. PATENT DOCUMENTS

| | | |
|---|---|---|
| 628,714 | 7/1899 | Ingersoll . |
| 683,455 | 10/1901 | Fergusson . |
| 711,621 | 10/1902 | Fergusson . |
| 1,104,352 | 7/1914 | Erlandsson . |
| 1,227,738 | 5/1917 | Bellis et al. . |
| 1,688,148 | 10/1928 | Martin . |
| 2,010,058 | 8/1935 | Carlson ................................... 240/58 |
| 2,036,567 | 4/1936 | Cannon ................................... 240/53 |
| 2,067,868 | 1/1937 | Vom Lehn .......................... 240/2.14 |
| 2,679,121 | 5/1954 | Hoofer ..................................... 40/10 |
| 2,727,137 | 12/1955 | Oharenko ............................... 240/90 |
| 3,495,795 | * 2/1970 | Brown . |
| 3,765,633 | 10/1973 | Caudill ................................. 248/229 |
| 4,283,038 | 8/1981 | Kurtz .................................... 248/478 |
| 4,413,801 | 11/1983 | Lancaster et al. ................... 248/316 |
| 5,203,529 | 4/1993 | Penniman ............................ 248/228 |
| 5,911,395 | * 6/1999 | Hussaini ............................ 248/316.4 |

FOREIGN PATENT DOCUMENTS

| | | | |
|---|---|---|---|
| 763188 | * 4/1934 | (FR) ................................ 248/229.12 |
| 56083593 | * 12/1956 | (NL) ................................ 248/229.12 |

* cited by examiner

Primary Examiner—Alvin Chin-Shue
(74) Attorney, Agent, or Firm—Bracewell & Patterson, L.L.P.

(57) ABSTRACT

An assembly to selectively hold and position a light source is disclosed, the assembly comprising a mounting bracket or base adapted to be secured to a yard implement or similar device including a tubular frame and an attachment bracket adapted to hold a light source, where the mounting bracket and attachment bracket are pivotably coupled so as to allow flexibility in the positioning of the light source.

12 Claims, 3 Drawing Sheets

ILLUMINATION ASSEMBLY

BACKGROUND OF THE INVENTION

1. Field of the Invention

The present invention relates to an attachment assembly. More particularly, the present invention relates to a support and attachment assembly to secure a source of illumination at a desired attitude and location.

2. Description of the Prior Art

There are numerous occasions when it is desirable to temporarily affix a source of illumination to an object. In this connection, it is common practice to use a support assembly to secure a light source in a desired location proximate a workbench. Such support assemblies are illustrated, for example, in U.S. Pat. Nos. 711,621; 2,727,137 and 1,688, 148.

The disadvantage of each of the assemblies illustrated in these patents is the lack of flexibility to secure light sources of different sizes. In this connection, the support structures disclosed in these patents are designed to be secured to a lamp of a lighting socket of a predetermined diameter.

Such rigidity of application, while acceptable in areas utilizing standardized lighting fixtures, is generally not practical where lighting sources of many different configurations may be potentially used. For example, applications which contemplate the attachment of variously sized portable light sources, e.g. flashlights , cannot provide the desired utility for applications useful with yard implements, bicycle and motorcycle applications and other areas where it is desirable to temporarily mount a portable light source.

SUMMARY OF THE INVENTION

The present invention addresses the above-identified and other advantages of prior art attachment and mounting systems.

In one embodiment, the present invention includes an intermediate frame which is bounded by a first and second attachment system. The first end of the frame defines a "U" shaped clamping assembly which is adapted to be secured to a frame or other rounded or semi-rounded object. The second end defines two "C" shaped clamp members which are slidably disposed about a track such that they may be moved vis-a-vis each other to secure variously sized lighting sources in a substantially fixed position.

The frame is preferably comprised of at least two components which are pivotably coupled so as to allow a range of motion in at least one plane by the user. In a second embodiment, a ball joint may be utilized to provide virtually unlimited degrees of freedom between the two systems.

The present invention presents a number of advantages over prior art attachment and mounting systems. One such advantage is that the system may be used with a wide variety of differently sized lighting sources. Another advantage is that the lighting source may be readily adjusted vis-a-vis the object to which the system is attached.

Other advantages will become obvious in light of the following figures and the disclosure and description of the preferred embodiments.

DETAILED DESCRIPTION OF THE PREFERRED EMBODIMENTS

Figure 1:
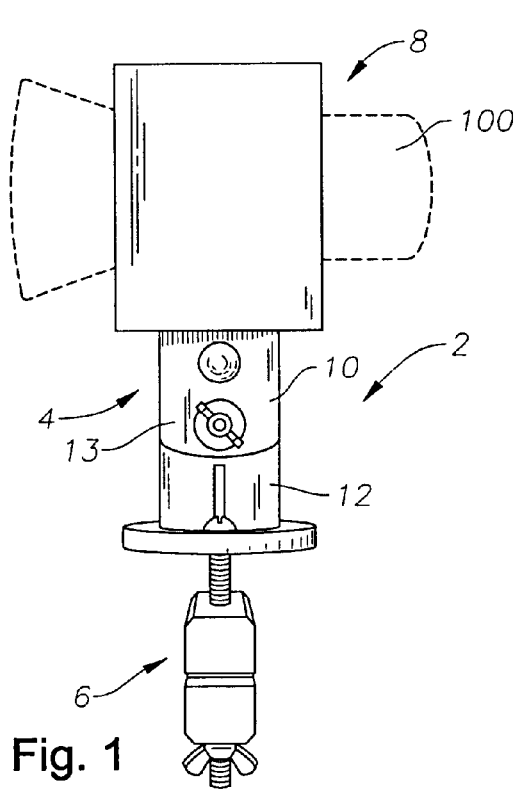
FIG. 1 is a first side view of one embodiment of the invention.
Figure 2:
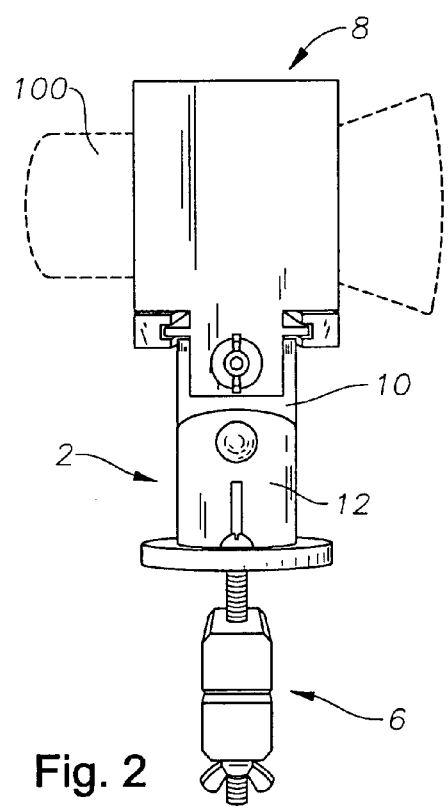
FIG. 2 is a second side view of the embodiment illustrated in FIG. 1.
Figure 6:
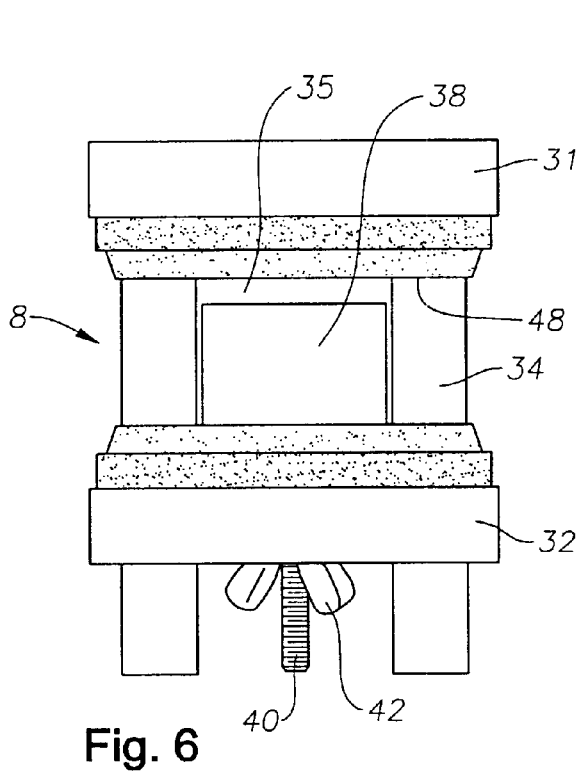
FIG. 6 is a top view of the embodiment illustrated in FIG. 1.
Figure 7:
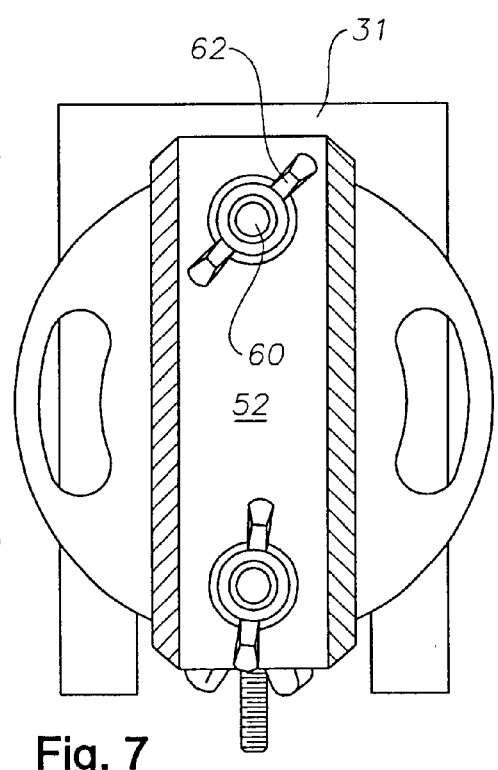
FIG. 7 is a bottom view of the embodiment illustrated in FIG. 1.
Figure 3:
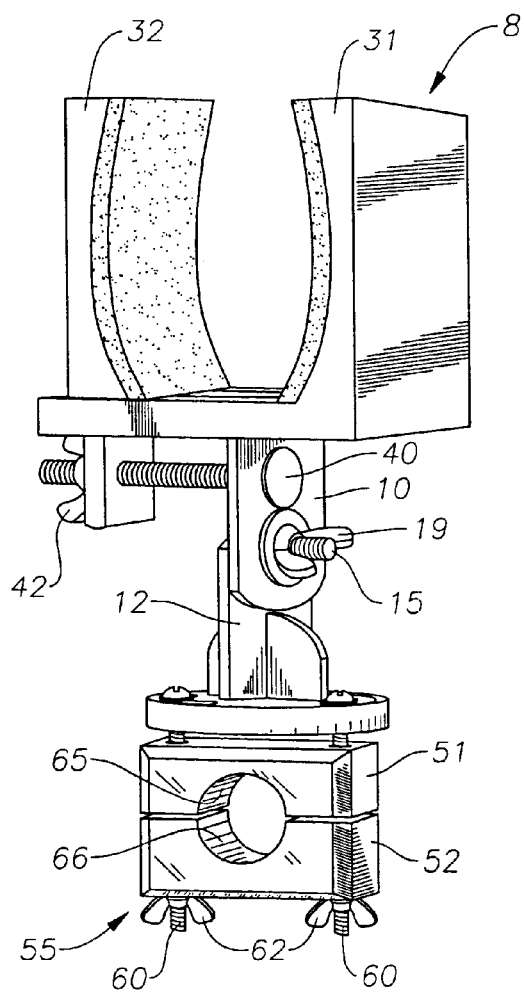
FIG. 3 is a perspective view of the embodiment illustrated in FIG. 1.

One embodiment of the present invention may be seen by reference to FIGS. 1–3 and 5–7 where may be seen a supporting base member 6 and an attachment assembly 8 joined by a pivot assembly 4.

Pivot assembly 4 is comprised of a first stationary attachment member 10 and a second supporting base attachment 12 member, where said first and second members are pivotally disposed vis-a-vis each other via a pivot or support means 13. In the illustrated embodiment, pivot means 13 comprises a fastener, e.g. a bolt or support fastener 15, disposed through an aperture 16 formed in both first 10 and second 12 members and secured with an adjustable locking fastener 19, e.g. a wingnut. In such a fashion, the first 10 and second 12 members are relatively moveable in at least one plane. Moreover, the relative position of the first 10 and second 12 members may be adjusted by loosening or tightening pivot means 13 in a conventional fashion.

Figure 5:
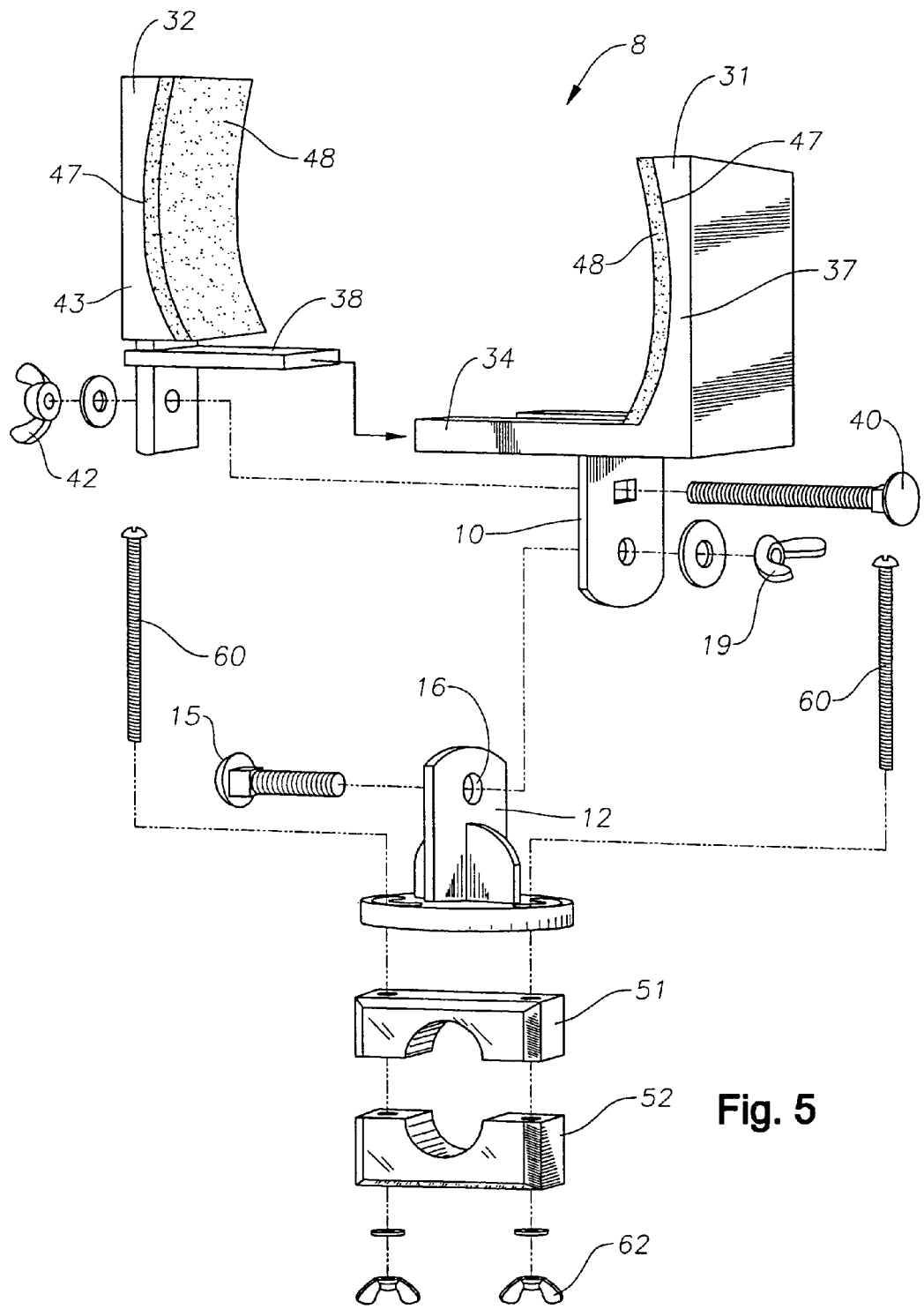
FIG. 5 is an exploded view of the embodiment illustrated in FIG. 1.

First stationary member 10 may be affixed to or integrally formed with an attachment assembly 8 which generally comprises a stationary member 31 and a traveling member 21. Traveling member 35 is generally "L" shaped in configuration and defines an upright portion or traveling upright member 43 and a tongue or traveling plate 38. As illustrated, stationary member 31 also describes an "L" shape and includes a stationary upright portion 37 and a stationary base 34, where said stationary base 34 defines a slot 35 sized to receive traveling member 32. The stationary upright portion 37 is joined to and extending orthogonally from the stationary base 34 as shown in FIG. 5. The stationary base 34 has a pair of spaced apart legs 11 as clearly shown in FIG. 2. Each leg 11 has a free end 14 and an inner surface 18 with a channel 17 formed therein. In such a fashion, traveling member 32 is adapted to be slidably received within support member 31. The stationary attachment member 10 is joined to and extending from the stationary base 34 in an opposite direction to the stationary upright member 37.

Support member 31 and traveling member 32 both define opposed "C" shaped contact surfaces 47, as illustrated. In a preferred embodiment, surfaces 47 are provided with a cushioned, contact layer 48 to aid in securing said illumination assembly 100 in a relatively non-slip fashion. The traveling plate 38 is carried in the slot 35 and has lateral edges 39 that are slidably received within the channels 17 of the legs 11. A traveling upright member 43 is joined to and extending from the traveling plate 38 in opposed fashion to the stationary upright member. It is contemplated that layer 48 be made from a closed cell, foam rubber, through other materials of comparable performance are also contemplated within the spirit of the invention.

The relative juxtaposition of support member 31 and traveling member 32 is governed by a closure system which may include one or more conventional fastening systems, e.g. a bolt or attachment fastener 40 and nut 42, which may be selectively tightened about a given appliance, e.g. a flashlight 100. In such a fashion, the traveling member 32 is slid toward stationary member 31 until the object, e.g. a flashlight, is adequately compressed between the two so as to secure it in a desired position. The traveling member is then secured in place by tightening the fastening system.

Second supporting base attachment member 12 maybe attached to or formed integrally with second attachment system 6 which comprises a proximal 51 and a distal member 52, where said proximal and distal members are moveably disposed vis-a-vis each other about a track which is itself comprised of an adjustable fastening assembly 55. Proximal 51 and distal members 52 include two "C" shaped faces, 65 and 66 respectively, to aid in securing the system to a given support structure which has a supporting surface. The support structure herein contemplated may include a bicycle, a lawnmower or other yard appliance.

In the illustrated embodiment, a support fastener or fastening assembly 55 comprises a pair of fasteners 60 disposed through second member 12, proximal member 51 and distal member 52 form a clamp and is secured by a locking means 62, e.g. wingnuts, in the manner illustrated. In such a fashion, clamp members 51 and 52 are slidably disposed about a track formed of fasteners 60 which are secured at their terminal ends by wingnuts 62. Tightening of locking means 62 urges clamp member 51 against 52. In such a fashion, the system may be clampingly secured to a pole or a variety of differently configured structures as long as portion of said structure is sized to fit between clamp members 51 and 52. A supporting base attachment member 12 extends from the supporting base 6 and has an overlapping portion 22 that is in side-by side contact with an overlapping portion 23 of the stationary base attachment member 10, and a support fastener 15, 19 extends through the overlapping portions to secure the supporting base attachment member 12 to the stationary base attachment member 10 in selected orientations. This includes having a pivotal arrangement between the stationary base attachment member 10 and the supporting base attachment member 12.

Figure 4:
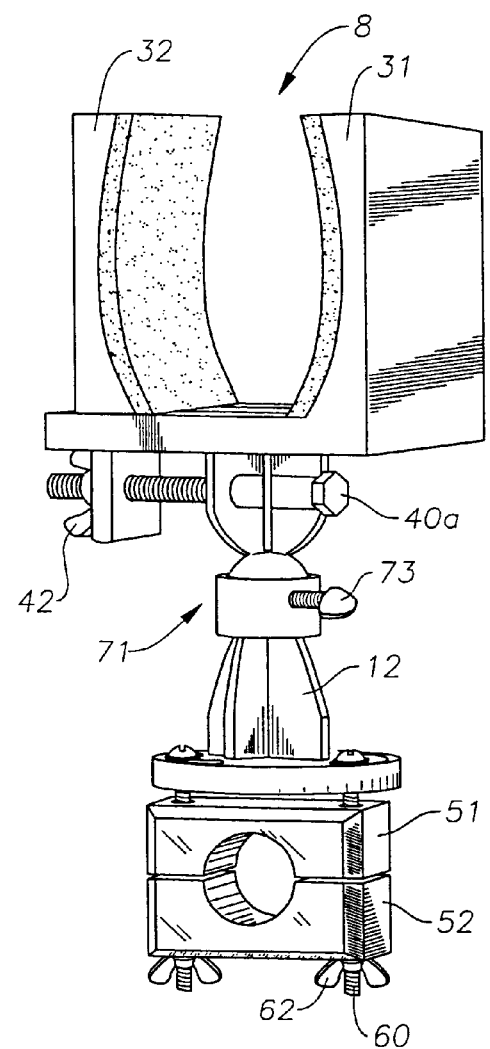
FIG. 4 is a perspective view of an alternate embodiment of the invention.

An alternate embodiment of the invention may be seen by reference to FIG. 4 in which is illustrated an alternate pivot means. In this embodiment, first 10 and second 12 members are coupled about a ball joint 71 where the rotation of said ball is controlled by a thumb screw 73 or an equivalent mechanism. In such a fashion, the illumination assembly carried in attachment assembly 8 may be rotatably manipulated to assume any number of orientations vis-a-vis base 6.

While the instant invention has particular application to portable lighting assemblies, it should be understood that it also has application to various other implements which by their nature are desirable to support at desired and various positions.

It is envisioned that one or more components of the invention may be manufactured from a high strength plastic or polymer. It is further contemplated that the components be interchangeable so as to provide the option to use variously sized clamping elements as the need should arise.

Although particular detailed embodiments of the apparatus and method have been described herein, it should be understood that the invention is not restricted to the details of the preferred embodiment. Many changes in design, composition, configuration and dimensions are possible without departing from the spirit and scope of the instant invention.

What is claimed is:

1. An attachment system for holding a flashlight comprising:
   a stationary base having a pair of spaced apart legs, defining a slot therebetween, each of the legs having a free end and an inner surface with a groove formed therein;
   a stationary upright member joined to and extending orthogonally from the stationary base;
   a stationary attachment member joined to and extending from the stationary base in an opposite direction to the stationary upright member;
   a traveling plate carried in the slot and having lateral edges with tongue portions that are slidably received within the grooves of the legs, the free ends of the legs allowing the traveling plate to be inserted and withdrawn from engagement with the grooves by moving the plate parallel to the stationary base;
   a traveling upright member joined to and extending from the traveling plate in opposed fashion to the stationary upright member;
   a traveling attachment member extending from the traveling plate in opposed fashion to the stationary attachment member; and
   an attachment fastener extending between the attachment members that draws and retains the attachment members and thus the upright members at variable distances from each other to retain a flashlight between the upright members.

2. The attachment system of claim 1, further comprising:
   a supporting base adapted to be secured to a supporting surface;
   a supporting base attachment member extending from the supporting base into engagement with the stationary base attachment member; and
   a support fastener that selectively fastens the stationary base attachment to the supporting base attachment member in various orientations to select a desired position for the upright members relative to the supporting base .

3. The attachment system of claim 1, further comprising:
   a supporting base adapted to be secured to a supporting surface;
   a supporting base attachment member extending from the supporting base and having an overlapping portion that is in side-by-side contact with an overlapping portion of the stationary base attachment member; and
   a support fastener extending through the overlapping portions to secure the supporting base attachment member to the stationary base attachment member in selected orientations.

4. The attachment system of claim 1, further comprising:
   a supporting base; and
   a supporting base attachment member extending from the supporting base and pivotally secured to the stationary base attachment member, to enable the stationary base to be pivotally oriented and secured in a desired position relative to the supporting base.

5. The attachment system of claim 1, further comprising:
   a supporting base adapted to be secured to a supporting surface;
   a pair of clamps joined to the supporting base for clamping about a supporting surface;
   a supporting base attachment member extending from the supporting base into engagement with the stationary base attachment member; and a support fastener that selectively fastens the stationary base attachment to the supporting base attachment member in various orientations to select a desired position for the upright members relative to the supporting base.

6. A supporting assembly for mounting a flashlight to a supporting structure, said assembly comprising:

an "L" shaped stationary member including an upstanding portion defining a contact surface and a base member having a pair of spaced-apart parallel legs that define a slot, each leg having a free end and an inward facing surface with a groove formed therein;

a traveling member having a plate portion that is carried in the slot, the plate portion having side edges with tongue portions that are received within the grooves of the legs, the traveling member having an upright portion defining a contact surface that is opposed to the contact surface of the stationary member for receiving a flashlight therebetween;

a traveling attachment member joined to and extending from the traveling member away from the upright portion of the traveling member;

stationary attachment member joined to and extending from the stationary member away from the upright member of the stationary member;

an attachment fastener connected between the stationary member and the traveling member parallel to the base member to maintain the upright portions of the stationary and traveling members about the flashlight.

7. The assembly according to claim 6, wherein the traveling attachment member and the stationary attachment member are flat plates.

8. The assembly according to claim 6, further comprising:

a support member adapted to be secured to a supporting object;

a support attachment member extending from the support member into engagement with the stationary attachment member; and a support fastener that secures the support attachment member to the stationary attachment member at selected angular orientations.

9. The assembly according to claim 6, further comprising:

a support member;

a support attachment member extending from the support member into engagement with the stationary attachment member;

a support fastener that secures the support attachment member to the stationary attachment member at selected angular orientations; and a clamp mounted to the support member for securing the support member to a supporting object.

10. An attachment system for holding a flashlight comprising:

a flat stationary base having a pair of spaced apart legs, defining a slot therebetween, each of the legs having a free end and an inner surface with a groove formed therein;

a stationary upright member joined to and extending upward from the stationary base, the stationary member having a generally concave inward facing surface;

a stationary attachment member joined to and extending downward from the stationary base;

a traveling plate carried in the slot and having side edges with tongue portions that are slidably received within the grooves of the legs;

a traveling upright member joined to and extending upward from the traveling plate in opposed fashion to the stationary upright member, the traveling upright member having a generally concave inward facing surface that cooperates with the inward facing surface of the stationary upright member to receive a flashlight therebetween;

a traveling attachment member extending downward from the traveling plate in opposed fashion to the stationary attachment member;

an attachment fastener extending between the attachment members that draws and retains the attachment members and thus the upright members at variable distances from each other to retain the flashlight between the upright members;

a supporting base adapted to be secured to a supporting surface;

a supporting base attachment member extending upward from the supporting base and having an overlapping portion that is in side-by-side contact with an overlapping portion of the stationary base attachment member; and a support fastener extending through the overlapping portions to secure the supporting base attachment member to the stationary base attachment member in selected orientations.

11. The attachment system of claim 10, wherein the attachment members comprise thin flat braces.

12. The attachment system of claim 10, wherein the stationary attachment member is longer than the traveling attachment member to provide access to the attachment fastener.

* * * * *